(12) United States Patent
Czajkowski

(10) Patent No.: US 9,400,635 B1
(45) Date of Patent: Jul. 26, 2016

(54) METHODS AND APPARATUS FOR PERFORMING DYNAMIC DATA ALIGNMENT FOR FLOATING-POINT OPERATIONS

(71) Applicant: Altera Corporation, San Jose, CA (US)

(72) Inventor: Tomasz Sebastian Czajkowski, Toronto (CA)

(73) Assignee: Altera Corporation, San Jose, CA (US)

( * ) Notice: Subject to any disclaimer, the term of this patent is extended or adjusted under 35 U.S.C. 154(b) by 566 days.

(21) Appl. No.: 13/741,266

(22) Filed: Jan. 14, 2013

(51) Int. Cl.
*G06F 5/01* (2006.01)

(52) U.S. Cl.
CPC ..................... *G06F 5/012* (2013.01)

(58) Field of Classification Search
None
See application file for complete search history.

(56) References Cited

U.S. PATENT DOCUMENTS

| | | | |
|---|---|---|---|
| 5,757,687 A * | 5/1998 | Naffziger et al. | 708/501 |
| 6,148,314 A | 11/2000 | Matheny et al. | |
| 7,546,328 B2 | 6/2009 | Schulte et al. | |
| 2012/0311009 A1 | 12/2012 | Jarrett et al. | |

FOREIGN PATENT DOCUMENTS

| | | |
|---|---|---|
| EP | 0298717 A2 | 1/1989 |
| EP | 0800133 A1 | 10/1997 |

* cited by examiner

*Primary Examiner* — Michael D Yaary
(74) *Attorney, Agent, or Firm* — Jason Tsai

(57) ABSTRACT

An integrated circuit is provided that performs floating-point operations involving at least two successive computational steps. Two floating-point numbers entering any additional computational step after the first computational step are aligned dynamically by shifting the mantissa of the floating-point number with the greater exponent to the left and the mantissa of the floating-point number with the smaller exponent to the right. The number of left shift bits is dependent on the magnitude of the difference between the two floating-point exponents and the number of leading zeroes in the mantissa with the greater exponent. The number of right shift bits is dependent on the magnitude of the difference between the two floating-point exponents and the number of left shift bits.

23 Claims, 7 Drawing Sheets

METHODS AND APPARATUS FOR PERFORMING DYNAMIC DATA ALIGNMENT FOR FLOATING-POINT OPERATIONS

BACKGROUND

This invention relates to performing floating-point arithmetic operations in integrated circuits and, more particularly, to dynamic alignment techniques for floating-point operations.

Floating-point operations are usually implemented in accordance with the IEEE754 standard, which defines a floating-point number as consisting of a sign, a mantissa, and an exponent, where the mantissa is required to be normalized at all times because the standard implies a leading "1." However, performing normalization is expensive in terms of circuit area and operational latency. Some floating-point operations also require that the floating-point number operands are manipulated as part of a floating-point operation. For example, floating-point addition and substraction require that the mantissas of the floating-point number operands are aligned in such a way that the exponents of the floating-point number operands are equal.

Situations frequently arise where several floating-point operations are executed sequentially (e.g. in an adder tree). Such sequentially executed operations require the normalization of the mantissa produced by a first adder stage followed by the alignment of the mantissas entering a second adder stage.

SUMMARY

The present invention relates to integrated circuits having improved floating-point operation capabilities. An integrated circuit may have circuitry that performs floating-point operations. This circuitry may receive a first floating-point number having a first exponent and a first mantissa and a second floating-point number having a second exponent and a second mantissa. The circuitry may compare the first and second exponents to determine whether the first exponent is greater than the second exponent. In response to determining that the first exponent is greater than the second exponent, the circuitry may left shift the first mantissa by a number of bits to produce a first shifted mantissa and compute the sum of the first shifted mantissa and the second mantissa.

The circuitry may further compute a difference between the first and second exponents, compute a left bit shift amount based on the difference between the first and second exponents, and left shift the first mantissa, the left bit shift amount to produce the first shifted mantissa.

It is appreciated that the present invention can be implemented in numerous ways, such as a process, an apparatus, a system, a device, instructions on a computer readable medium. Several inventive embodiments of the present invention are described below.

In certain embodiments, the above mentioned circuitry may count a number of leading zeroes of the first mantissa. This denormalization number and the difference between the first and second exponents are characterized by a minimum value and the left bit shift amount is set equal to the minimum of the denormalization number and the difference between the first and second exponents.

In other cases, a right bit shift amount may be computed based on the difference between the first and second exponents and the left bit shift amount. The second mantissa may be right shifted by the right bit shift amount to produce a shifted second mantissa and the adder may compute a sum of the first and second shifted mantissas.

Further features of the invention, its nature and various advantages, will be more apparent from the accompanying drawings and the following detailed description of the preferred embodiments.

DETAILED DESCRIPTION

Embodiments of the present invention relate to performing floating-point arithmetic operations in integrated circuits and, more particularly, to dynamic alignment techniques for floating-point operations.

Floating-point operations are usually implemented in accordance with the IEEE754 standard, which defines a floating-point number as consisting of a sign, a mantissa, and an exponent, where the mantissa is required to be normalized at all times because the standard implies a leading "1." Furthermore, floating-point addition and substraction require that the mantissas of the floating-point number operands are aligned in such a way that the exponents of the floating-point number operands are equal in value.

Situations frequently arise where several floating-point operations are executed sequentially (e.g., a multiplication followed by an addition to implement a sum-of-products operation as frequently observed in FIR filter implementations or the addition of more than two numbers in an adder tree). Such sequentially executed operations require the normalization of the mantissa produced by a first floating-point operation stage. This may be followed by the alignment of the mantissas entering a subsequent floating-point operation stage in case this operation is an addition. However, normalization and alignment operations are expensive in terms of circuit area and operational latency. Furthermore, both operations may adjust the mantissa and exponent by shifting the mantissa and increasing or decreasing the exponent accordingly.

It may be desirable to implement a dynamic alignment operation that combines the normalization and alignment operations in between successive floating-point addition operations, thereby removing potential operational inefficiencies.

It will be obvious to one skilled in the art, that the present exemplary embodiments may be practiced without some or all of these specific details. In other instances, well-known operations have not been described in detail in order not to unnecessarily obscure the present embodiments.

Figure 1:
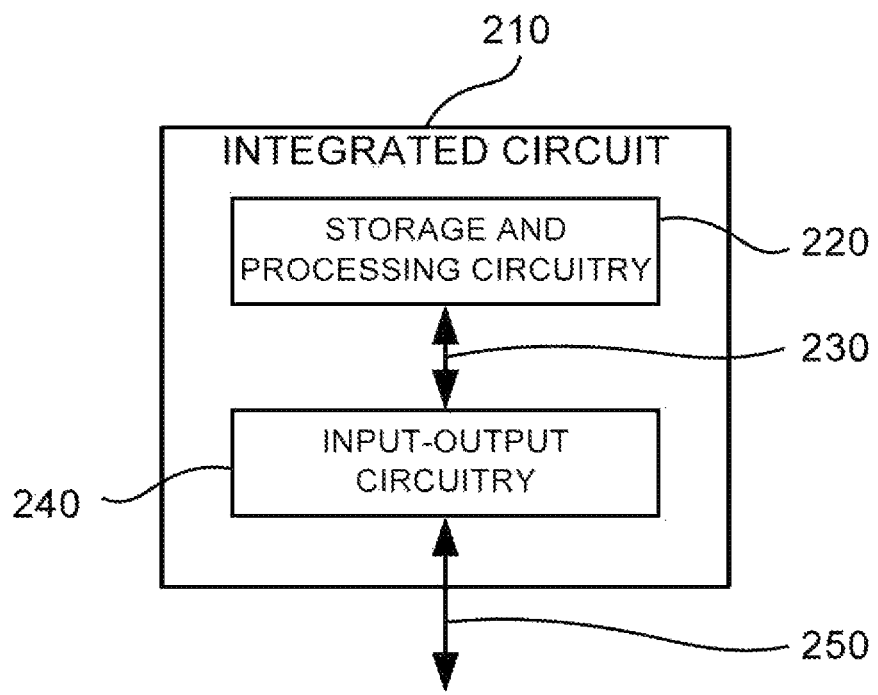
FIG. 1 is an illustrative diagram of an integrated circuit in accordance with an embodiment of the present invention.

An illustrative embodiment of an integrated circuit 210 in accordance with the present invention is shown in FIG. 1.

Integrated circuit 210 may include storage and processing circuitry 220 and input-output circuitry 240. Storage and processing circuitry 220 may include embedded microprocessors, digital signal processors (DSP), microcontrollers, or other processing circuitry. The storage and processing circuitry 220 may further have random-access memory (RAM), first-in first-out (FIFO) circuitry, stack or last-in first-out (LIFO) circuitry, read-only memory (ROM), or other memory elements. Input/output circuitry may include parallel input/output circuitry, differential input/output circuitry, serial data transceiver circuitry, or other input/output circuitry suitable to transmit and receive data. Internal interconnection resources 230 such as conductive lines and busses may be used to send data from one component to another component or to broadcast data from one component to one or more other components. External interconnection resources 250 such as conductive lines and busses, optical interconnect infrastructure, or wired and wireless networks with optional intermediate switches may be used to communicate with other devices.

Figure 2:
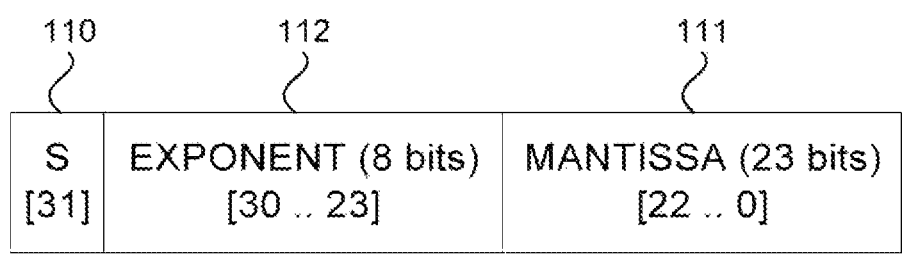
FIG. 2 is an illustrative diagram of a single precision floating-point number in accordance with an embodiment of the present invention.

Floating-point numbers are commonplace for representing real numbers in scientific notation in computing systems and are designed to cover a large numeric range and diverse precision requirements. The IEEE754 standard is commonly used for floating-point numbers. A floating-point number, such as the floating-point number illustrated in FIG. 2 includes three different parts: the sign of the floating-point number 110, the mantissa 111, and the exponent 112. Each of these parts may be represented by a binary number and, in the IEEE754 format, have different bit sizes depending on the precision. For example, a single precision floating-point number such as the floating-point number in FIG. 2 requires 32 bits, which are distributed as follows: one sign bit (bit 31), eight exponent bits (bits [30:23]), and 23 mantissa bits (bits [22:0]). A double precision floating-point number requires 64 bits including one sign bit (bit 63), 11 exponent bits (bits [62:52]), and 52 mantissa bits (bits [51:0]).

According to the IEEE754 standard, a mantissa may also have additional bits. A mantissa that has additional bits is sometimes also referred to as an extended mantissa. For example, an extended, single precision mantissa may have five additional bits (i.e. an extended, single precission mantissa may consist of 28 bits instead of 23 bits). The last three bits added to the right of the least significant bit represent round, guard, and sticky bits. The two remaining bits are added beyond the most significant bit position and may absorb any overflow produced by a floating-point arithmetic operation.

The sign of a floating-point number according to standard IEEE754 is represented using a single bit, where a "0" denotes a positive number and a "1" denotes a negative number.

The exponent of a floating-point number preferably is an unsigned binary number which, for the single precision format, ranges from 0 to 255. In order to represent a very small number, it is necessary to use negative exponents. To achieve this the exponent preferably has a negative bias associated with it. For single precision floating-point numbers, the bias preferably is −127. For example a value of 140 for the exponent actually represents (140−121)=13, and a value of 100 represents (100−127)=−27. For double precision numbers, the exponent bias preferably is −1023.

As discussed above, according to the IEEE754 standard, the mantissa is a normalized number (i.e., it has no leading zeroes and represents the precision component of a floating point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

Figure 3:
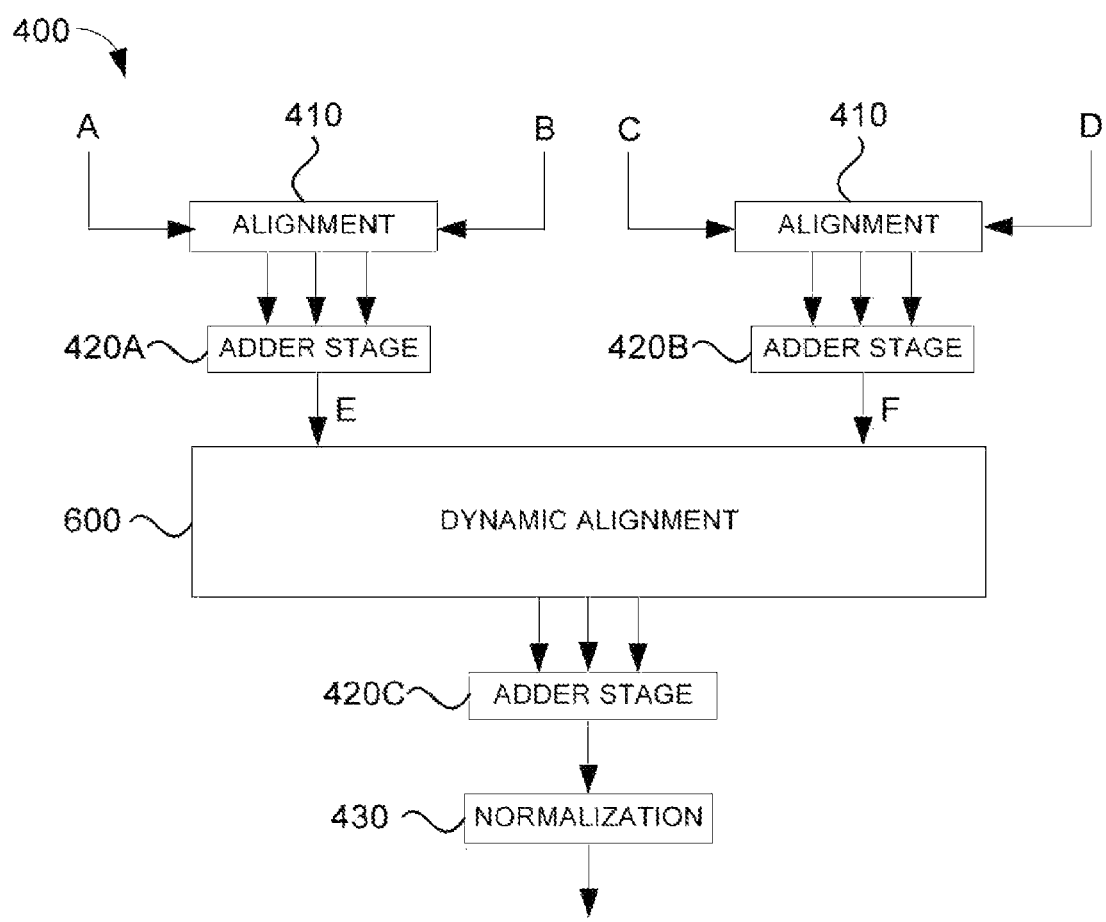
FIG. 3 is an illustrative diagram of two successive floating-point adder stages in accordance with an embodiment of the present invention.

Consider a scenario where four floating-point numbers (e.g., A, B, C, and D) are added together. An illustrative diagram of the addition of these four floating-point numbers by an adder tree such as adder tree 400 is shown in FIG. 3. Adder tree 400 may include two alignment stages 410, adder stages 420A, 420B, and 420C, a normalization stage 430, and a dynamic alignment stage 600. Adder tree 400 described in FIG. 3 is merely illustrate and is not intended to limit the scope of the present invention. If desired, adder tree 400 may have more or less adder stages, adder tree 400 may receive more than four floating-point numbers, adder tree 400 may be arranged differently and at each stage add one new floating-point number, etc.

Adder tree 400 as shown in FIG. 3 may first add A to B and C to D. In preparation for the addition, floating-point numbers A and B and floating-point numbers C and D need to be aligned with each other such that the exponents of those floating-point numbers are equal using alignment stages 410.

Figure 4:
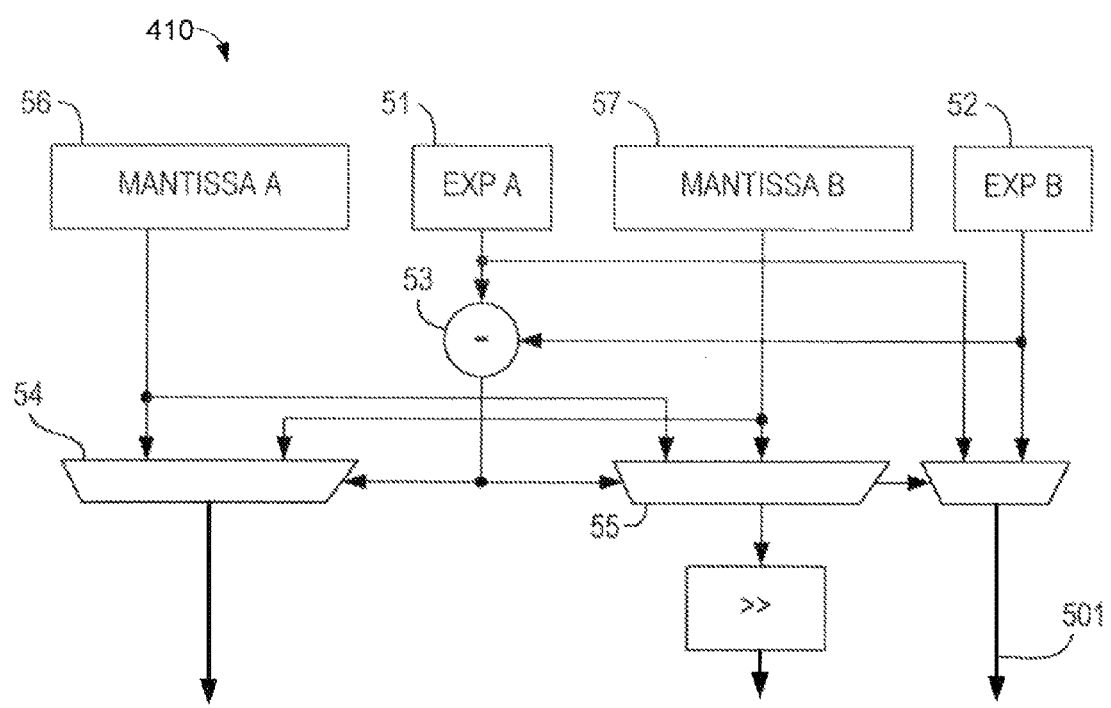
FIG. 4 is an illustrative diagram of an alignment operation in preparation of performing a floating-point addition in accordance with an embodiment of the invention.

An illustrative diagram of an embodiment of alignment stage 410 to align the exponents of floating-point numbers A and B is shown in FIG. 4. The two exponents of floating-point number A and floating-point number B are compared at subtractor 53, and the result is used to control multiplexers 54 and 55. Multiplexer 54 may select the mantissa 56 or 57 of the floating-point number with the larger exponent while multiplexer 55 may select the mantissa 56 or 57 of the floating-point number with the smaller exponent. The mantissa that is selected by multiplexer 55 is right-shifted by a number of bits based on the magnitude of the difference between the two exponents 51 and 52. The larger of the two input exponents 51 or 52 is output as the resultant exponent 501.

Adder stages 420A and 420B may receive the aligned floating-point numbers from alignment stage 410 as shown in FIG. 3. Depending on the signs of the received operands, adder stages 420A and 420B may either implement an add or a substract operation. For example, in the scenario that the signs of floating-point numbers A and B are the same, adder stage 420A may add the received mantissas of floating point numbers A and B and send the resulting floating-point number E to dynamic alignment stage 600. Floating-point number E may include the sum of the aligned mantissas of A and B, the sign bit, and the exponent of the floating-point number with the larger exponent. In the scenario that floating-point numbers C and D have a different sign, adder stage 420B may substract the received mantissas of floating-point numbers C and D. Adder stage 420B may also determine the sign bit by comparing the magnitude of the positive and negative floating-point numbers. Alternatively, a substraction operation may for example be implementing by swapping the sign to positive, converting the mantissa into its 2's complement, and performing an addition. The result of such an operation may be negative. In this case, the mantissa needs to be converted into its 2's complement again and the sign inverted to indicate a negative number. In this scenario, adder stage 420B may send the resulting floating point number F, which consists of the difference of the mantissas, the resulting sign bit, and the greater of the two exponents to dynamic alignment stage 600.

Any adder stage such as adder stage 420A, 420B, or 420C may produce an overflow (i.e. a floating point number with more than one bit in front of the radix point). In the scenario that an adder stage produces an overflow, the adder stage may normalize the floating point number representing the sum. For example, adder stage 420A may increment the exponent and shift the mantissa of the floating point number E representing the sum by one bit to the right. Adder stage 420A may handle an overflow before sending the floating point number representing the sum to dynamic alignment stage 600. Alternatively, dynamic alignment stage 600 may have a stage for handling overflow in the floating point number E received from adder stages 420A.

Dynamic alignment stage 600 (see also FIG. 6 described below) may send the aligned floating-point numbers from the first adder stage to the second adder stage 420C which may implement an add or a substract operation depending on the sign bits as explained above. Adder stage 420C may send the result of the add or substract operation to normalization stage 430.

Figure 5:
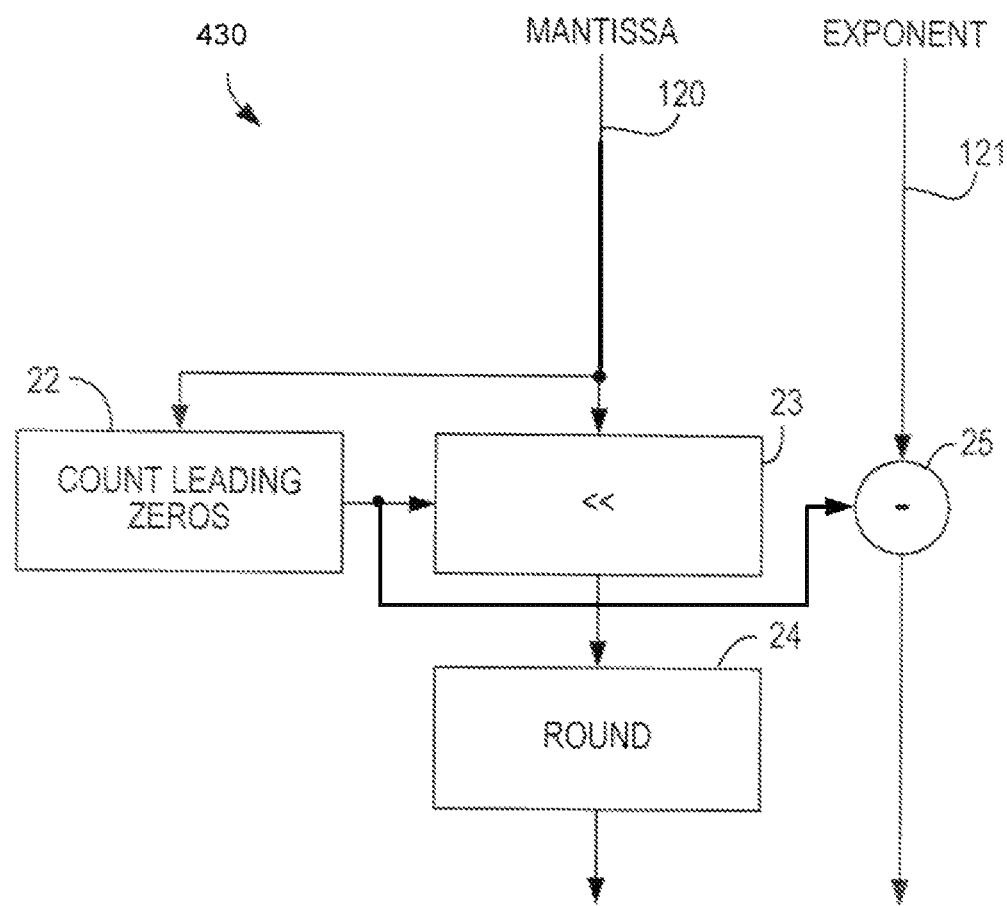
FIG. 5 is an illustrative diagram of a normalization operation on the result of a floating-point addition in accordance with an embodiment of the invention.

An illustrative diagram of an embodiment of normalization stage 430, which may convert the result of adder stage 420C to the same value represented in the IEEE754 standard format is shown in FIG. 5. Block 22 may determine the position of a first "1" by counting the number of leading zeroes in mantissa 120 to identify the implied leading "1". The mantissa is then left-shifted in block 23 by the number found in block 22 to obtain a leading "1", which is then eliminated because the leading "1" is implied by the IEEE754 standard. Any necessary rounding is performed in block 24. To convert exponent 121, an offset adjustment is subtracted from the exponent by subtractor 25 to account for the left shift operation in block 23. Hence, the offset adjustment in block 25 is determined by the number of leading zeroes determined in block 22.

Figure 6:
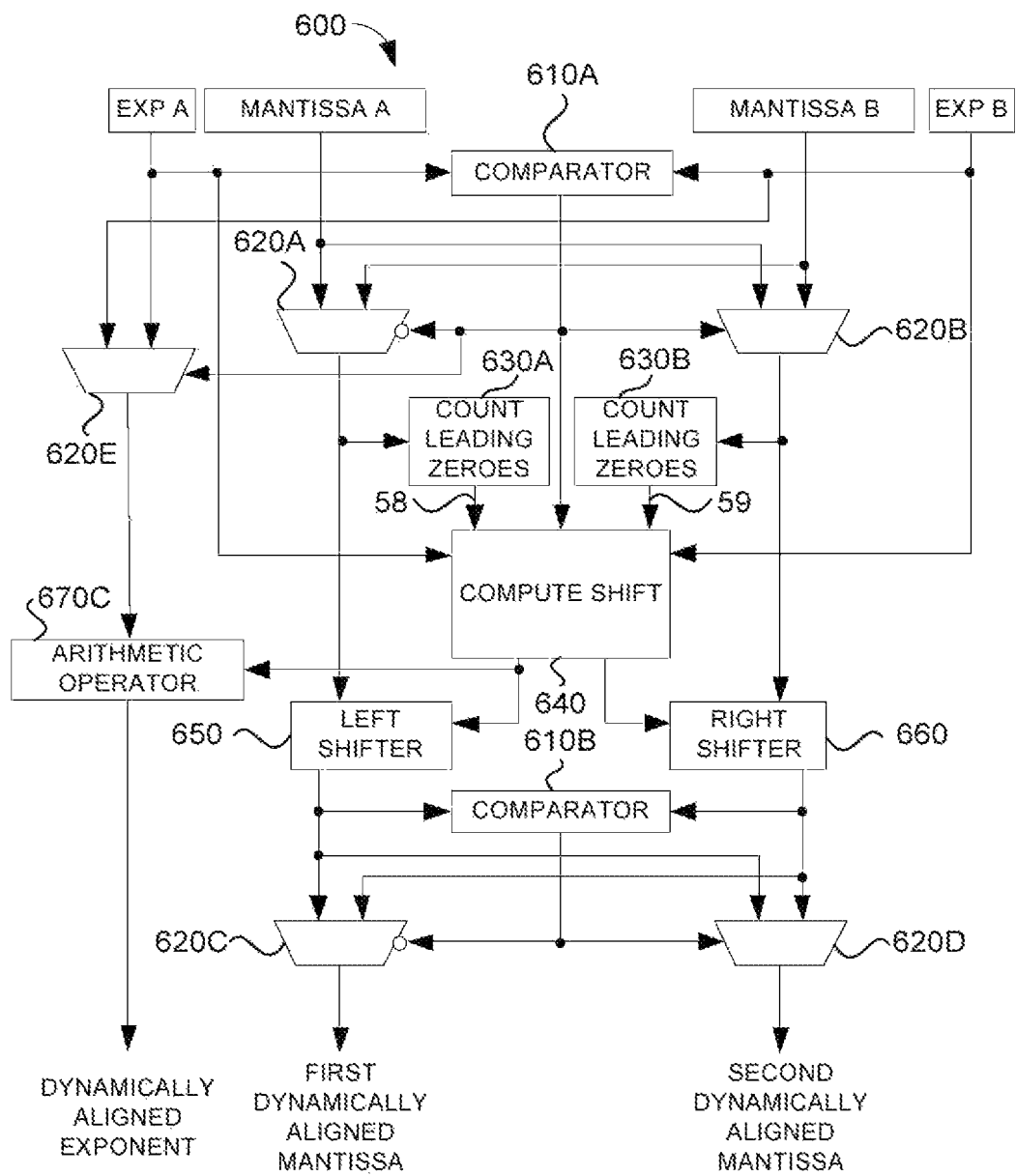
FIG. 6 is an illustrative diagram of a dynamic alignment operation in accordance with an embodiment of the present invention.

An illustrative diagram of an embodiment of dynamic alignment stage 600 is shown in FIG. 6. Dynamic alignment stage 600 may include different components, such as comparators 610A and 610B, multiplexers 620 (e.g., multiplexers 620A, 620B, 620C, 620D, and 620E), blocks 630A and 630B for computing leading zeroes, a compute shift block 640 for computing the number of right shift and left shift bits, a left shifter 650, a right shifter 660, and an arithmetic operator 670C.

Consider the scenario where dynamic alignment stage 600 receives two floating-point numbers A and B, each having a mantissa and an exponent. In this scenario, the mantissa of floating-point number A and/or the mantissa of floating-point number B may be in form of an extended mantissa. According to standard IEEE754, an extended, single precision mantissa may have 5 additional bits (i.e. an extended mantissa may consist of 28 bits instead of 23 bits). The last three bits added to the right of the least significant bit represent round, guard, and sticky bits. The two remaining bits are added beyond the most significant bit position and may absorb any overflow produced by a floating-point arithmetic operation.

Comparator 610A may compare the exponents of A and B and provide a signal associated with the result of the comparison that controls multiplexers 620A, 620B, and 620E. Multiplexers 620A and 620B each select one of the two mantissas of floating-point numbers A and B. For example, comparator 610A may direct multiplexer 620A to select the mantissa of the floating-point number with the larger exponent, and comparator 610A may direct multiplexer 620B to select the mantissa of the floating-point number with the smaller exponent. Similarly, comparator 610A may direct multiplexer 620E to select the larger of the two exponents of floating point numbers A and B.

Blocks 630A and 630B may count the leading zeroes of the respective mantissas of the floating-point numbers selected by multiplexers 620A and 620B. Hence, block 630A may count the leading zeroes of the mantissa associated with the floating-point number that has the larger exponent, while block 630B may count the leading zeroes of the mantissa associated with the floating-point number that has the smaller exponent. The number of leading zeroes 58 and 59 as determined by block 630A and 630B, respectively, are sent to compute shift block 640.

Figure 7:
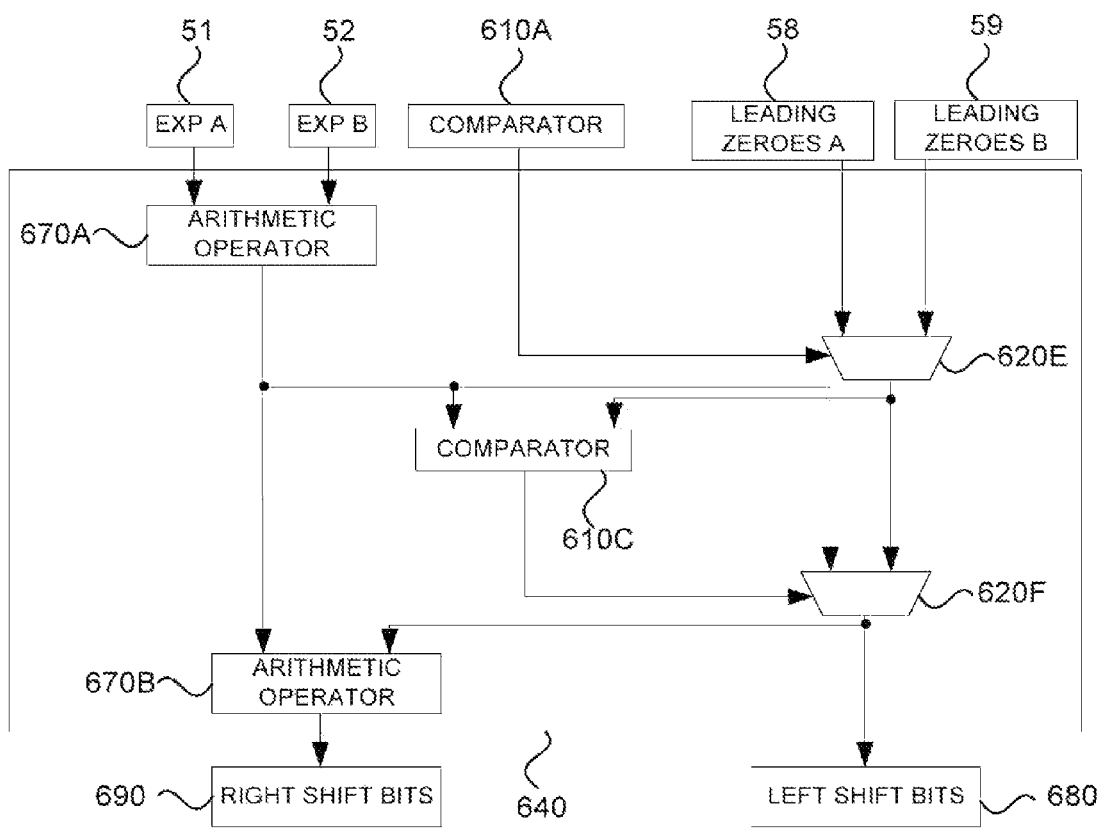
FIG. 7 is an illustrative diagram of circuitry that computes a number of left shift bits that a first mantissa is shifted to the left and a number of right shift bits that a second mantissa is shifted to the right in accordance with an embodiment of the present invention.

Compute shift block 640 may serve to determine the number of left shift bits and right shift bits by which the mantissas of the floating-point numbers A and B are shifted to the left and to the right, respectively. FIG. 7 shows an illustrative diagram of a compute shift block 640.

As shown in FIG. 7, compute shift block 640 may include arithmetic operators 670A and 670B, comparator 610C, and multiplexers 620E and 620F. Compute shift block 640 may receive the exponents 51 and 52 of the two floating-point numbers. Compute shift block 640 may also receive the number of leading zeroes 58 and 59 as determined by block 630A and 630B of FIG. 6, respectively, as well as the signal associated with the result of the comparison between the exponents of A and B as provided by comparator 610A of FIG. 6.

Arithmetic operator 670A may receive the two exponents 51 and 52 and produce a signal representing the absolute value of the difference between the exponents of A and B. Multiplexer 620E may receive the number of leading zeroes 58 and 59 and select the one for which the corresponding exponent is larger as determined by comparator 610A. The selection in multiplexer 610A is motivated by the fact that the number of left shift bits is determined first and only the floating-point number with the larger exponent may be shifted left with the goal of reducing the remaining right shift operations required to align the exponents of A and B.

Comparator 610C and multiplexer 620F receive both the signal representing the absolute value of the difference between the exponents of A and B from arithmetic operator 670A and the number of leading zeroes selected by multiplexer 620E. Comparator 610C compares the two received signals and directs multiplexer 620F to select the smaller one of the two for propagation as left shift bits 680. The rationale for selecting the smaller one of the absolute value of the difference between the exponents of A and B and the number of leading zeroes selected by multiplexer 620E is that the mantissa doesn't need to be shifted more to the left than is required to align the two floating point numbers A and B, and that the mantissa cannot be shifted more bits to the left than there are leading zeroes.

Left shifting the mantissa with the larger exponent by left shift bits 680 may not be sufficient to align the two floating point numbers A and B. An additional right shift operation may be required. The right shift bits 690 by which the mantissa of the floating-point number with the smaller exponent is right shifted may be computed using arithmetic operator 670B. Arithmetic operator 670B may compute the right shift bits 690 as the difference between the absolute value of the difference between the exponents as determined by arithmetic operator 670A and the left shift bits 680.

Arithmetic operator 670C in FIG. 6 may receive the left shift bits from compute shift block 640 and decrease the larger of the two exponents received from multiplexer 620E by a corresponding amount, thereby producing the dynamically aligned exponent.

Left shifter 650 may also receive the left shift bits from compute shift block 640 and shift the mantissa of the floating-point number received from multiplexer 620A by the corresponding number of bits to the left. Similarly, right shifter 660 may receive the right shift bits from compute shift block 640 and shift the mantissa of the floating-point number received from multiplexer 620B by the corresponding number of bits to the right.

At this point, the exponents of the two floating-point numbers are equal and the mantissas shifted accordingly. As a result, the mantissa of the floating-point number with the larger exponent may now be smaller than the mantissa of the floating-point number with the smaller exponent. Comparator 610B together with multiplexers 620C and 620D may swap the two mantissas of the floating-point numbers such that the larger mantissa is always output as the first dynamically aligned mantissa and the smaller mantissa is always output as the second dynamically aligned mantissa. This order is arbitrary and may be inverted (i.e., the larger mantissa may be output as the second dynamically aligned mantissa while the smaller mantissa is output as the first dynamically aligned mantissa). For that purpose, comparator 610B may compare the shifted mantissas produced by left shifter 650 and right shifter 660 and control the selection in multiplexers 620C and 620D accordingly.

Figure 8:
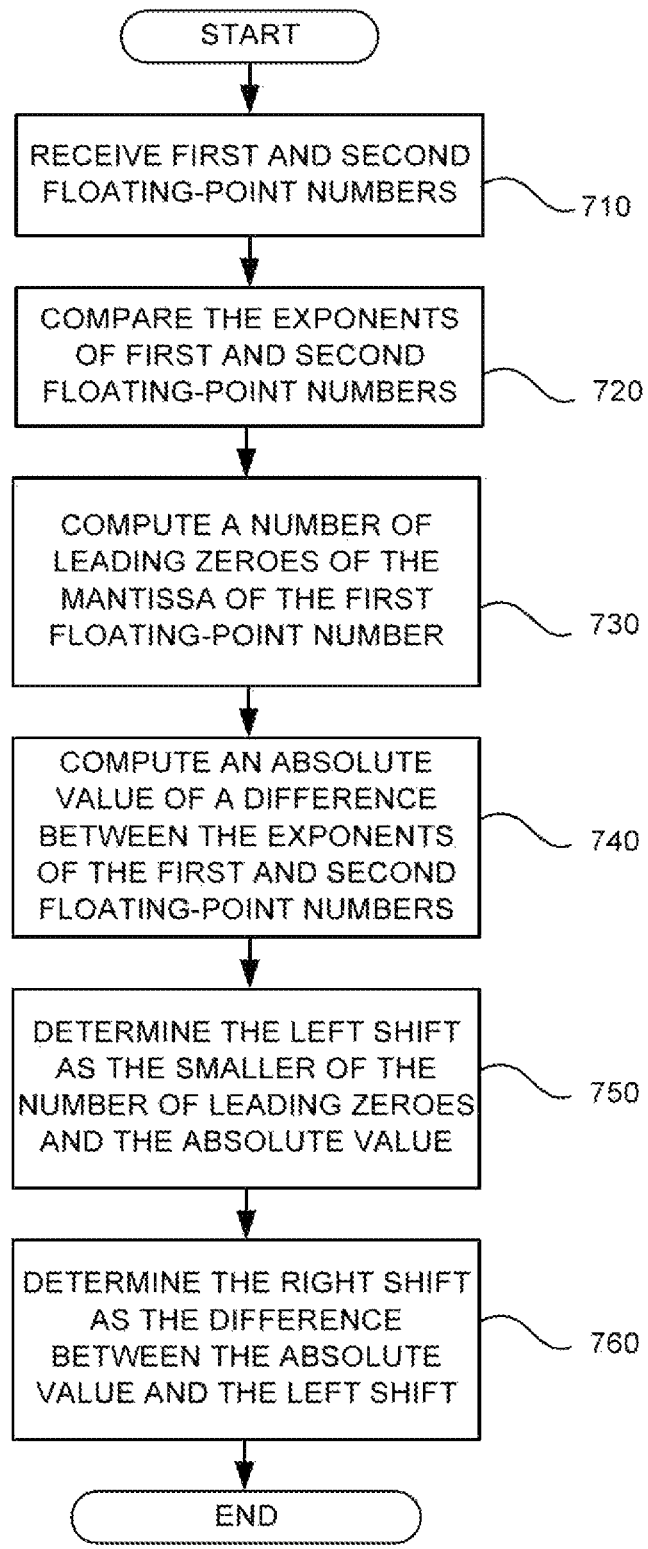
FIG. 8 is a flow chart of illustrative steps for computing the number of left shift bits and the number of right shift bits in accordance with an embodiment of the present invention.

Illustrative steps for performing the dynamic alignment operation are shown in the flow chart of FIG. 8. During step 710, dynamic alignment stage may receive first and second floating-point numbers. Dynamic alignment operation may compare the exponents of first and second floating-point numbers during step 720, and assuming that the first floating-point number has a larger exponent, compute a number of leading zeroes for the mantissa of the first floating-point number (at step 730).

During step 740, dynamic alignment stage may compute an absolute value of the difference between the exponents of the first and second floating-point numbers. Alternatively, dynamic alignment stage may use the comparison result from step 720 to select the first and second operands of the subtraction operation implemented in step 740 such that the result is always positive. During step 750, dynamic alignment stage may determine the left shift as the smaller of the number of leading zeroes of the first mantissa computed during step 730 and the absolute value of the difference between the exponents of floating-point numbers A and B computed during step 740. Finally, during step 760, dynamic alignment stage may determine the right shift as the difference between the absolute value of the difference between the exponents of floating-point numbers A and B computed during step 740 and the left shift determined during step 750.

The method and apparatus described herein may be incorporated into any suitable integrated circuit or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPLAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for performing floating-point operations, comprising:
   receiving a first binary floating-point number from a floating-point operator, wherein the first binary floating-point number has a first exponent and a first mantissa that is denormalized without an implicit leading one;
   receiving a second binary floating-point number having a second exponent and a second mantissa;
   with a comparator circuit, comparing the first and the second exponent to determine whether the first exponent is greater than the second exponent;
   in response to determining that the first exponent is greater than the second exponent, left shifting the first mantissa by a number of bits to produce a first shifted mantissa; and
   with an adder circuit, computing the sum of the first shifted mantissa and the second mantissa.

2. The method of claim 1, wherein left shifting the first mantissa further comprises:
   computing a difference between the first and second exponents;
   computing a left bit shift amount based on the difference between the first and second exponents; and
   left shifting the first mantissa by the left bit shift amount to produce the first shifted mantissa.

3. The method of claim 2, wherein left shifting the first mantissa further comprises:
   computing a denormalization number, wherein computing the denormalization number comprises counting a number of leading zeroes of the first mantissa.

4. The method of claim 3, wherein the denormalization number and the difference between the first and second exponents are characterized by a minimum value, and wherein the left bit shift amount is set equal to the minimum value.

5. The method of claim 4, wherein the first binary floating-point number comprises a negative number, and wherein computing the denormalization number comprises counting a number of leading ones of the first mantissa.

6. The method of claim 4 further comprising:
   computing a right bit shift amount based on the difference between the first and second exponents and the left bit shift amount;
   right shifting the second mantissa by the right bit shift amount to produce a shifted second mantissa; and
   with the adder circuit, computing a sum of the first and second shifted mantissas.

7. The method of claim 6 wherein the right bit shift amount is the left bit shift amount subtracted from the difference between the first and second exponents.

8. The method of claim 6 further comprising:
computing an additional denormalization number by counting a number of leading zeroes of the sum of the first and second shifted mantissas.

9. The method of claim 8 further comprising:
left shifting the sum of the first and second shifted mantissas by the additional denormalization number to produce a normalized mantissa of the sum;
determining a normalized exponent of the sum based on the first exponent, the left shift bit amount, and the additional denormalization number; and
providing the normalized mantissa of the sum and the normalized exponent of the sum at an output.

10. A method for using an integrated circuit to align a first and second binary floating-point number to perform a floating-point operation, wherein each of the first and second binary floating-point numbers comprise a mantissa and an exponent, the method comprising:
with a comparator circuit, determining whether the exponent of the first binary floating-point number is greater than the exponent of the second binary floating-point number; and
in response to determining that the exponent of the first binary floating-point number is greater than the exponent of the second binary floating point number, left shifting the mantissa of the first binary floating-point number by a first given number of bits with a first shifter circuit and right shifting the mantissa of the second binary floating-point number a second given number of bits with a second shifter circuit.

11. The method of claim 10 further comprising:
determining a first number of leading zeroes of the mantissa of the first binary floating-point number;
computing a difference between the exponents of the first and second binary floating-point numbers; and
computing the first given number of bits based on the first number of leading zeroes and the difference between the exponents.

12. The method of claim 11 further comprising:
computing the second given number of bits based on the first given number of bits and the difference between the exponents.

13. The method of claim 10 further comprising:
in response to determining that the exponent of the second binary floating-point number is greater than the exponent of the first binary floating point number, right shifting the mantissa of the first binary floating-point number a third given number of bits with the second shifter circuit, and left shifting the mantissa of the second binary floating-point number a fourth given number of bits with the first shifter circuit.

14. Circuitry that performs floating-point operations, comprising:
a first input that receives a first floating-point number having a first exponent and a first mantissa;
a second input that receives a second floating-point number having a second exponent and a second mantissa;
first and second shifters, wherein the first shifter receives a first signal and generates a left shifted signal based on the received first signal shifted a first number of bits to the left, and wherein the second shifter receives a second signal and generates a right shifted signal based on the received second signal shifted a second number of bits to the right; and
a circuit that receives the first and second floating-point numbers from the first and second inputs, wherein the circuit is configured to compute the first number of bits and the second number of bits based on the received first and second floating-point numbers, and wherein the circuit further includes a first counter that receives the first mantissa from the first input and counts a number of leading zeroes in the first mantissa and a second counter that receives the second mantissa from the second input and counts a number of leading zeroes in the second mantissa.

15. The circuitry of claim 14 further comprising:
a comparator coupled to the first and second inputs, wherein the comparator receives the first and second exponents from the first and second inputs, and wherein the comparator generates a comparison result by comparing the first and second exponents.

16. The circuitry of claim 15, wherein the circuit further comprises:
a multiplexer that receives the number of leading zeroes in the first mantissa from the first counter and the number of leading zeroes in the second mantissa from the second counter, wherein the multiplexer selects a number of leading zeroes based on the comparison result from the comparator.

17. The circuitry of claim 16, wherein the circuit further comprises:
an arithmetic operator stage that receives the first and second exponents from the first and second inputs and that produces an absolute value of a difference between the first and second exponents; and
an additional comparator that receives the absolute value from the arithmetic operator stage and the selected number of leading zeroes from the multiplexer and that generates an additional comparison result based on a comparison between the absolute value and the selected number of leading zeroes.

18. The circuitry of claim 17, wherein the circuit further comprises:
an additional multiplexer that receives the absolute value from the arithmetic operator stage and the selected number of leading zeroes from the multiplexer and that selects the first number of bits based on the additional comparison result from the additional comparator; and
an additional arithmetic operator stage that receives the absolute value of the difference of the first and second exponents from the additional arithmetic operator stage and the first number of bits from the additional multiplexer and that produces the second number of bits based on a difference of the absolute value and the first number of bits.

19. The circuitry of claim 15 further comprising:
an output;
an adder stage; and
a second circuit configured to route each of the first and second mantissas from the first and second inputs to at least one of the first and second shifters, wherein the second circuit is further configured to route the left and right shifted signals generated from the first and second shifters to the adder stage and to route signals generated from the adder stage to the output.

20. The circuitry of claim 19, wherein the second circuit further comprises:
a third circuit configured to select a greater mantissa and a smaller mantissa of the first and second mantissas based on the comparison result from the comparator, and wherein the third circuit is further configured to route the greater mantissa to the first shifter and the smaller mantissa to the second shifter.

21. The circuitry of claim 19, wherein the second circuit further comprises:
   a comparator that receives the left and right shifted signals generated from the first and second shifters, wherein the comparator generates a comparison result based on a comparison between the left and right shifted signals;
   a first multiplexer coupled to the adder stage, wherein the first multiplexer receives the left and right shifted signals from the first and second shifters, and wherein the first multiplexer selects a greater of the received signals based on the comparison result from the comparator; and
   a second multiplexer coupled to the adder stage, wherein the second multiplexer receives the left and right shifted signals from the first and second shifters, and wherein the second multiplexer selects a smaller of the received signals based on the comparison result from the comparator.

22. The circuitry of claim 19 further comprising:
   a third circuit having an input and an output, wherein the input of the third circuit is coupled to the adder stage, and wherein the third circuit is configured to convert a signal received from the adder stage in accordance with a standard requiring an implied leading bit.

23. The circuitry of claim 22 wherein the third circuit is configured to add at least one of a first number of leading zeroes and a second number of trailing zeroes to avoid underflow and overflow.

\* \* \* \* \*